United States Patent
Ahn

(10) Patent No.: US 10,664,076 B2
(45) Date of Patent: May 26, 2020

(54) TOUCH DRIVING DEVICE

(71) Applicant: SILICON WORKS CO., LTD., Daejeon (KR)

(72) Inventor: YongSung Ahn, Seongnam-si (KR)

(73) Assignee: SILICON WORKS CO., LTD., Daejeon (KR)

( * ) Notice: Subject to any disclaimer, the term of this patent is extended or adjusted under 35 U.S.C. 154(b) by 43 days.

(21) Appl. No.: 15/771,361

(22) PCT Filed: Nov. 2, 2016

(86) PCT No.: PCT/KR2016/012486
§ 371 (c)(1),
(2) Date: Apr. 26, 2018

(87) PCT Pub. No.: WO2017/078379
PCT Pub. Date: May 11, 2017

(65) Prior Publication Data
US 2018/0307337 A1    Oct. 25, 2018

(30) Foreign Application Priority Data
Nov. 2, 2015  (KR) ..................... 10-2015-0153130

(51) Int. Cl.
*G06F 3/041*  (2006.01)
*G06F 3/044*  (2006.01)
*G06F 1/3234* (2019.01)

(52) U.S. Cl.
CPC ............ *G06F 3/041* (2013.01); *G06F 1/3262* (2013.01); *G06F 3/044* (2013.01); *G06F 3/0416* (2013.01)

(58) Field of Classification Search
CPC ...... G06F 1/3262; G06F 3/041; G06F 3/0416; G06F 3/044
See application file for complete search history.

(56) References Cited

U.S. PATENT DOCUMENTS

| | | | |
|---|---|---|---|
| 8,134,535 B2 | 3/2012 | Choi et al. | |
| 8,427,435 B2 | 4/2013 | Takahashi et al. | |
| 9,164,641 B1 | 10/2015 | Rowe | |
| 9,465,497 B2 | 10/2016 | Han et al. | |
| 2015/0170610 A1* | 6/2015 | Kurasawa | G09G 5/18 345/174 |
| 2017/0353596 A1* | 12/2017 | Park | G06F 3/0414 |

FOREIGN PATENT DOCUMENTS

| | | |
|---|---|---|
| KR | 10-2008-0080800 A | 9/2008 |
| KR | 10-2009-0054073 A | 5/2009 |
| KR | 10-2013-0134007 A | 12/2013 |
| KR | 10-2015-0080248 A | 7/2015 |

OTHER PUBLICATIONS

PCT International Search Report, PCT/KR2016/012486, dated Feb. 10, 2017, 4 Pages.

* cited by examiner

*Primary Examiner* — Nelson M Rosario
(74) *Attorney, Agent, or Firm* — Fenwick & West LLP

(57) ABSTRACT

The present invention provides a touch driving device comprising: a driving channel for supplying a first driving voltage to a sensor electrode in a multi-touch mode and supplying a second driving voltage smaller than the first driving voltage to a sensor electrode group in a one-touch mode; and a connection unit for connecting the sensor electrode to the driving channel in the first mode and connecting the sensor electrode group to the driving channel in the second mode.

15 Claims, 12 Drawing Sheets

TOUCH DRIVING DEVICE

CROSS-REFERENCE TO RELATED APPLICATION

If applicable, this application claims priority under 35 U.S.C § 119(a) of Patent Application No. 10-2015-0153130, filed on Nov. 2, 2015 in Korea, the entire contents of which are incorporated herein by reference. In addition, this non-provisional application claims priorities in countries other than the U.S. for the same reason based on the Korean Patent Applications, the entire contents of which are hereby incorporated by reference.

TECHNICAL FIELD

The present disclosure relates to a touch driving technique and, more particularly, to a touch driving technique for driving a touch panel.

BACKGROUND ART

A panel including a plurality of sensor electrodes for sensing a proximity or a touch of an object is commonly referred to as a touch panel.

Such a touch panel may be completely separated from a display panel for displaying an image according to the shape of the touch panel. However, in recent years, since the touch panel is coupled to the display panel in an integrated manner, the touch panel is sometimes referred to as a panel, without distinction with the display panel. In the following description, it can be understood that the panel includes a plurality of sensor electrodes for sensing the proximity or the touch of an object.

Meanwhile, the proximity or the touch of the object to the panel can be detected by a touch driving device driving this panel. The touch driving device supplies a driving voltage to the panel and receives a response signal to the driving voltage to detect the proximity or the touch of the object to the panel.

Meanwhile, a conventional touch driving device drives the panel every frame period. In this case, the touch driving device drives the panel even when the object is not in proximity to the panel, thereby unnecessarily consuming power.

DETAILED DESCRIPTION OF THE INVENTION

Technical Problem

From this background, in one aspect, an objective of the present disclosure is to provide a low-power touch driving technique that reduces power consumption by eliminating unnecessary touch driving.

Technical Solution

In order to achieve the above objective, in one aspect, the present disclosure provides a touch driving device for driving a touch panel including a plurality of sensor electrodes, including: a driving channel configured to supply a first driving voltage to the sensor electrode in a first mode and to supply a second driving voltage smaller than the first driving voltage to a sensor electrode group including at least two or more sensor electrodes in a second mode; and a connection unit configured to connect the sensor electrode to the driving channel in the first mode and to connect the sensor electrode group to the driving channel in the second mode.

The touch driving device may further include a sensing unit, wherein the sensing unit detects a proximity or a touch of an external object to the touch panel using a response signal of the sensor electrode to the first driving voltage or a response signal of the sensor electrode group to the second driving voltage, and is switched to the first mode and operated when the proximity or the touch of the external object to the touch panel is detected in the second mode. The connection unit may be also switched to the first mode and operated when the sensing unit detects the proximity or the touch of the external object to the touch panel in the second mode.

In another aspect, the present disclosure provides a touch driving device for driving a touch panel including a plurality of sensor electrodes, including: a first driving channel configured to supply a driving voltage to a first sensor electrode in a first mode and to supply the driving voltage to a first sensor electrode group including the first sensor electrode in a second mode; a second driving channel configured to supply the driving voltage to a second sensor electrode in the first mode and to supply the driving voltage to a second sensor electrode group including the second sensor electrode in the second mode; and a sensing unit configured to detect a proximity or a touch of an external object to the touch panel using a difference in a response signal of a first sensor electrode group to the driving voltage and a response signal of a second sensor electrode group to the driving voltage.

The sensing unit may detect the proximity or the touch of the external object to the touch panel using a response signal of the first sensor electrode to the driving voltage or the second sensor electrode to the driving voltage in the first mode, and may be switched to the first mode and operated when the proximity or the touch of the external object to the touch panel is detected in the second mode.

In still another aspect, the present disclosure provides a touch driving device for driving a touch panel including a plurality of sensor electrodes, including: a driving channel unit configured to supply a driving voltage to a first sensor electrode and a second sensor electrode in a first mode, to supply the driving voltage to a first sensor electrode group including the first sensor electrode in a first frame of a second mode, to receive a first response signal to a second sensor electrode group including the second sensor electrode, to supply the driving voltage to the second sensor electrode group in a second frame of the second mode, and to receive a second response signal to the first sensor electrode group; and a sensing unit configured to detect a proximity or a touch of an external object to the touch panel using a difference in the first response signal and the second response signal.

The sensing unit may detect the proximity or the touch of the external object to the touch panel using a response signal of the first sensor electrode to the driving voltage or the second sensor electrode to the driving voltage in the first mode, and may be switched to the first mode and operated when the proximity or the touch of the external object to the touch panel is detected in the second mode.

Advantageous Effect

As described above, according to the present disclosure, it is possible to reduce an amount of power required for touch driving by eliminating unnecessary touch driving.

MODE FOR CARRYING OUT THE INVENTION

Figure 1:
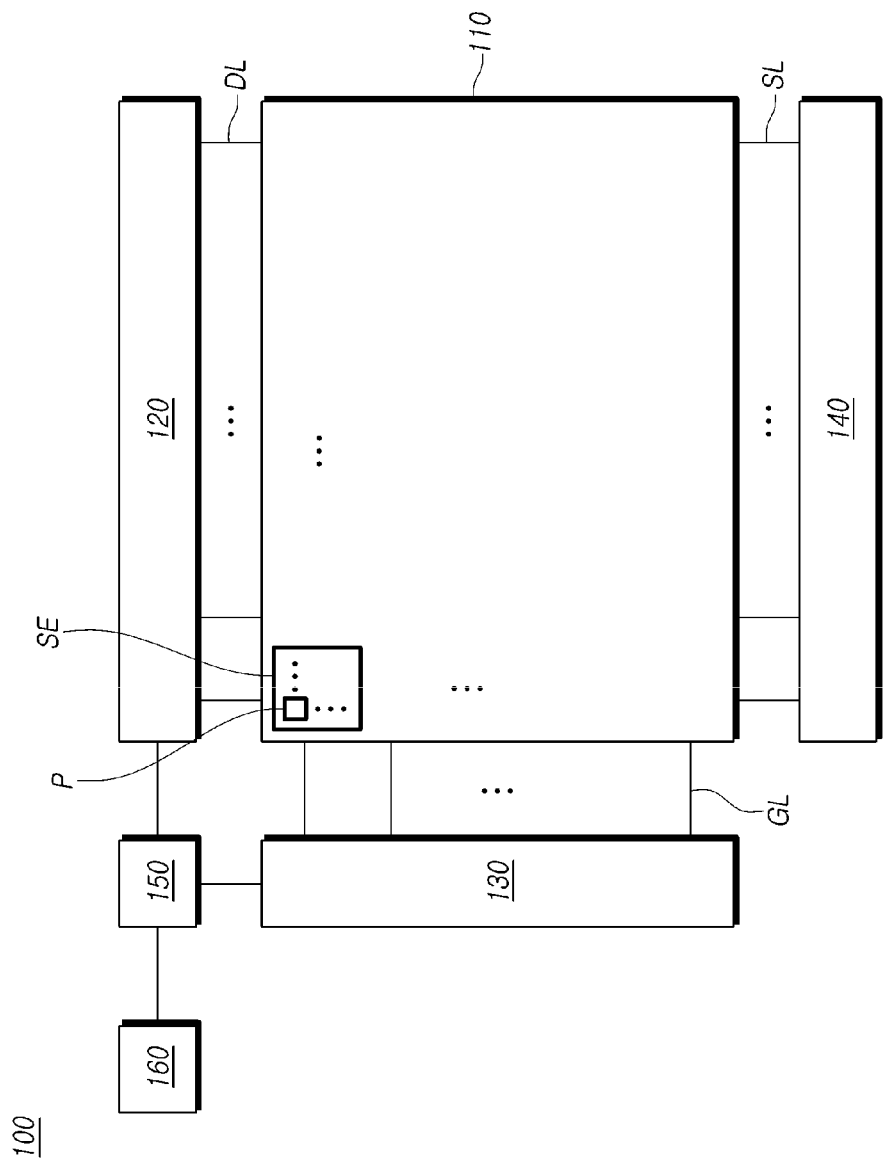
FIG. 1 is a view schematically showing a display device according to an embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a view schematically showing a display device according to an embodiment.

Referring to FIG. 1, a display device 100 includes a panel 110, a data driving circuit 120, a gate driving circuit 130, a touch driving circuit 140, a timing control circuit 150, a host 160, and the like.

In the panel 110, a plurality of data lines DL connected to the data driving circuit 120 may be formed and a plurality of gate lines GL connected to the gate driving circuit 130 may be formed. In addition, in the panel 110, a plurality of pixels P corresponding to intersections of the plurality of data lines DL and the plurality of gate lines GL may be defined.

In each pixel P, a transistor in which a first electrode (e.g., a source electrode or a drain electrode) is connected to the data line DL, a gate electrode is connected to the gate line GL, and a second electrode (e.g., a drain electrode or a source electrode) is connected to a display electrode may be formed.

Further, in the panel 110, a plurality of sensor electrodes SE may be spaced apart from each other. In a region in which the sensor electrode SE is located, one pixel P may be located or a plurality of pixels P may be located.

The panel 110 may include a display panel and a touch panel (TSP: Touch Screen Panel), wherein the display panel and the touch panel may share some components. For example, the plurality of sensor electrodes SE may be one component of the display panel (e.g., a common electrode to which a common voltage is supplied), and at the same time, may be one component (a sensor electrode for sensing a touch) of the touch panel. In view of the fact that some components of the display panel and the touch panel are shared with each other, the panel 110 is also referred to as an integrated panel, but the present disclosure is not limited thereto. In addition, an in-cell type panel is known in which some components of the display panel and the touch panel are shared with each other, but this is merely an example of the above-described panel 110, the panel to which the present disclosure is applied is not limited to the in-cell type panel.

The data driving circuit 120 supplies a data signal to the data line DL to display a digital image on each pixel P of the panel 110.

Such a data driving circuit 120 may include at least one data driver integrated circuit. The at least one data driver integrated circuit may be connected to a bonding pad of the panel 110 in a Tape Automated Bonding (TAB) or Chip On Glass (COG) method, or may be formed directly on the panel 110. In some cases, the at least one data driver integrated circuit may be integrated and formed on the panel 110. In addition, the data driving circuit 120 may be implemented in a Chip On Film (COF) method.

The gate driving circuit 130 sequentially supplies a scanning signal to the gate line GL to turn on or off a transistor located in each pixel P.

Such a gate driving circuit 130 may be located on one side of the panel 110 as shown in FIG. 1 or may be divided into two and located on both sides of the panel 110, according to a driving method thereof.

In addition, the gate driver circuit 130 may include at least one gate driver integrated circuit. The at least one gate driver integrated circuit may be connected to a bonding pad of the panel 110 in a TAB or COG method, or may be implemented in a Gate In Panel (GIP) type and formed directly on the panel 110. In some cases, the at least one gate driver integrated circuit may be integrated and formed on the panel 110. In addition, the gate driving circuit 130 may be implemented in a COF method.

The touch driving circuit 140 supplies a driving voltage to all or some of the plurality of sensor electrodes SE connected to a sensing line SL.

Although the touch driving circuit 140 may be provided outside the data driving circuit 120 and the gate driving circuit 130 as a separate component from the data driving circuit 120 and the gate driving circuit 130 as shown in FIG. 1, the touch driving circuit 140 may be implemented as the internal component of another separate driver integrated circuit including at least one of the data driving circuit 120 and the gate driving circuit 130 or may be implemented as the internal component of the data driving circuit 120 or the gate driving circuit 130.

Accordingly, the fact that the touch driving circuit 140 supplies the driving voltage to all or some of the plurality of sensor electrodes SE can be regarded that a separate driver integrated circuit including the touch driving circuit 140 supplies the driving voltage to all or some of the plurality of sensor electrodes SE. In addition, it can be also regarded that the data driving circuit 120 or the gate driving circuit 130 including the touch driving circuit 140 supplies the driving voltage to all or some of the plurality of sensor electrodes SE depending on the design method of the touch driving circuit 140.

Such a touch driving circuit 140 is not limited to the implementation and design method thereof, and may be another component itself or may be a component located inside or outside the other component as long as only the performance functions described herein are the same or similar to each other.

In addition, one touch driving circuit 140 is illustrated as being located in the display device 100 in FIG. 1, but the display device 100 may include two or more touch driving circuits 140.

Meanwhile, in order for the touch driving circuit 140 to supply the driving voltage to all or some of the plurality of sensor electrodes SE, the sensing line SL connected to each of the plurality of sensor electrodes SE is required. Accordingly, the sensing line SL that is connected to each of the plurality of sensor electrodes SE to transmit a driving voltage may be provided in the panel 110 in a first direction (e.g., longitudinal direction) or a second direction (e.g., transverse direction).

Meanwhile, the display device 100 may employ a capacitance touch method in which a proximity or a touch of an object is recognized by sensing a change in capacitance through the sensor electrode SE.

Such a capacitance touch method can be divided into, for example, a mutual capacitance touch method and a self-capacitance touch method.

In the mutual capacitance touch method, which is one type of the capacitance touch method, a driving voltage is supplied to one sensor electrode (Tx electrode) and another sensing electrode (Rx electrode) coupled to the Tx electrode is detected. In such a mutual capacitance touch method, a value detected by the Rx electrode varies depending on the proximity or the touch of an object such as a finger or a pen. The mutual capacitance touch method detects the presence or absence of a touch, touch coordinates, etc., using the value detected by the Rx electrode.

In the self-capacitance touch method, which is another type of the capacitance touch method, a driving voltage is supplied to one sensor electrode SE and then the corresponding sensor electrode SE is detected again. In such a self-capacitance touch method, a value detected by the corresponding one sensor electrode SE varies depending on the proximity or the touch of an object such as a finger or a pen. The self-capacitance touch method detects the presence or absence of touch, touch coordinates, etc., using the detected value. In the self-capacitance touch method, since the sensor electrode SE that supplies the driving voltage and the sensor electrode SE that performs sensing are the same, there is no distinction between the Tx electrode and the Rx electrode.

The display device 100 may employ one of the above-described two capacitance touch methods (the mutual capacitance touch method and the self-capacitance touch method). However, in this specification, for convenience of description, an embodiment will be described on the assumption that the self-capacitance touch method is employed.

Meanwhile, the display device 100 may drive the sensor electrode SE without distinguishing a display section from a touch section. As one example, the display device 100 may supply the driving voltage to all or some of the sensor electrodes SE in a section supplying a data signal.

As a specific example, the display device 100 may supply a sensor driving signal to the sensor electrode SE while supplying a data signal to a display electrode located in the pixel P. At this time, the display device 100 may change the data signal to correspond to the driving voltage in order to maintain a data voltage formed between the display electrode and the sensor electrode SE in the pixel P constant for a predetermined time (for example, one frame time).

The timing control circuit 150 supplies various control signals to the data driving circuit 120, the gate driving circuit 130, and the touch driving circuit 140.

The timing control circuit 150 may output a data control signal (DCS) for controlling the data driving circuit 120 and a gate control signal (GCS) for controlling the gate driving circuit 130 based on an external timing signal such as a vertical/horizontal synchronization signal (Vsync or Hsync), a video signal (RGB), a clock signal (CLK), or the like which is input from the host 160. In addition, the timing control circuit 150 may convert the video signal (RGB) input from the host 160 into a data signal format used by the data driving circuit 120 and may supply a converted video signal (R'G'B') to the data driving circuit 120. By way of an example, the timing control circuit 150 may convert the video signal (RGB) according to the resolution or pixel structure of the panel 110 and may supply the converted video signal (R'G'B') to the data driving circuit 120. Here, the video signal (RGB) and the converted video signal (R'G'B') may be referred to as video digital data, video data, or data.

The data driving circuit 120 may convert the converted video signal (R'G'B') into an analog pixel signal (data signal or data voltage) which is a voltage value corresponding to a gray-scale value in response to the data control signal (DCS) and the converted video signal (R'G'B') input from the timing control circuit 150, and may supply the obtained analog pixel signal to the data line (DL). The gate driving circuit 130 may sequentially supply a scanning signal to the gate line GL in response to the gate control signal (GCS) input from the timing control circuit 150.

The timing control circuit 150 may determine a mode of the display device 100 and may supply a mode signal indicating the determined mode to the data driving circuit 120, the gate driving circuit 130, and the touch driving circuit 140.

Such a mode may be determined by the host 160. The host 160 may determine the mode of the display device 100 and may transmit information about the determined mode to the timing control circuit 150, and the timing control circuit 150 may generate a mode signal based on the information about the determined mode. The timing control circuit 150 may supply the generated mode signal to the data driving circuit 120, the gate driving circuit 130, and the touch driving circuit 140.

Such a mode may be determined by the touch driving circuit 140. The touch driving circuit 140 may determine the mode of the display device 100 and may transmit information about the determined mode to the timing control circuit 150 or the host 160. The timing control circuit 150 or the host 160 may transmit the mode signal to another circuit (e.g., the data driving circuit 120 or the gate driving circuit 130) based on the information about the determined mode.

The mode of the display device 100 may be classified into various modes according to division elements thereof.

First, the mode of the display device 100 may be classified depending on whether the display device 100 is driven. For convenience of description, when it is assumed that a mode in which a display panel is driven is referred to as a Doze-1 mode and a mode in which the display panel is not driven is referred to as a Doze-2 mode, the display device 100 can be driven in the Doze-1 mode and the Doze-2 mode.

In the Doze-1 mode, the data driving circuit 120 may supply a data signal to the data line DL and the gate driving circuit 130 may supply a scanning signal to the gate line GL. In addition, in the Doze-2 mode, the data driving circuit 120 may not supply a data signal to the data line DL and the gate driving circuit 130 may not supply a scanning signal to the gate line GL. Since the data signal and the scanning signal are not supplied to the panel 110 in the Doze-2 mode, power consumption of the display device 100 is reduced.

The mode of the display device 100 may be classified depending on whether touch driving is performed or a touch driving method. For convenience of description, it is assumed that a mode in which no touch driving is performed is referred to as an idle mode, a mode in which two or more sensor electrodes SE are grouped and driven is referred to as a one-touch mode, and a mode in which the sensor electrodes SE are driven one by one is referred to as a multi-touch mode.

In the idle mode, the touch driving circuit 140 may not supply a driving voltage to the sensing line SL. In the one-touch mode and the multi-touch mode, the touch driving circuit 140 may supply a driving voltage to the sensing line SL.

In the one-touch mode, the touch driving circuit 140 may drive two or more sensor electrodes SE by grouping them. For example, in the one-touch mode, at least one sensor electrode group may be formed in the panel 110 and the touch driving circuit 140 may drive the sensor electrode group to detect a touch. As a more specific example, in the one-touch mode, one sensor electrode group may be formed in the panel 110 and the touch driving circuit 140 may drive the one sensor electrode group to detect a touch to the panel 110. The one sensor electrode group may include all of the sensor electrodes SE in the panel 110, or may include all of the remaining sensor electrodes SE except for some sensor electrodes SE disposed outside the panel 110.

In the multi-touch mode, the touch driving circuit 140 may drive the plurality of sensor electrodes SE one by one. In such a multi-touch mode, the touch driving circuit 140 may calculate a position at which an object touches the panel 110 and may generate the calculated position as a coordinate value.

In the idle mode, since the touch driving circuit 140 does not generate a driving voltage, power consumption of the display device 100 is reduced. In addition, in the one-touch mode, since the touch driving circuit 140 is driven in units of sensor electrode groups, the driving interval may be made longer than that in the multi-touch mode. Thus, the power consumption of the display device 100 is reduced in the one-touch mode.

Each mode can be switched to another mode according to predetermined conditions.

Figure 2A:
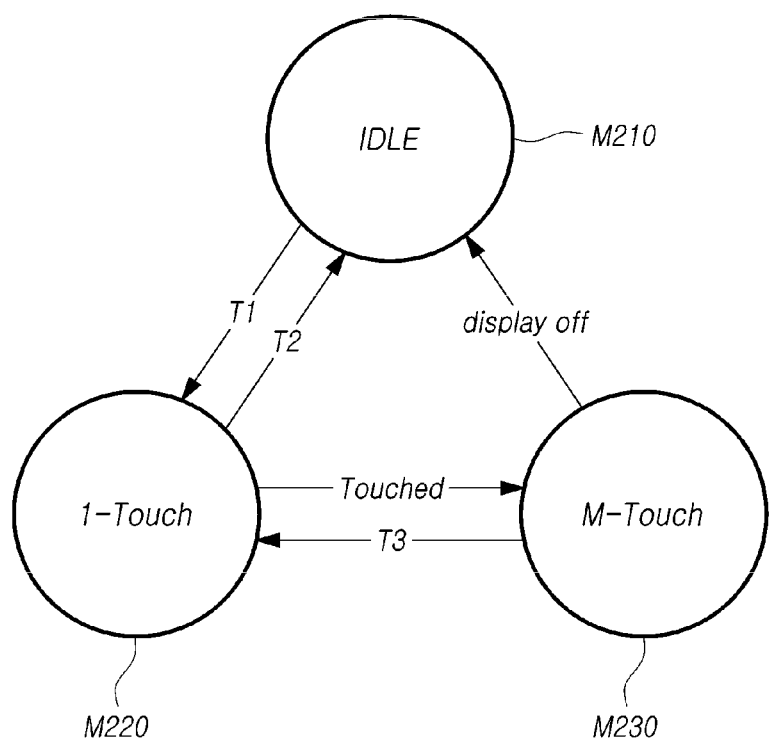
FIGS. 2A to 2C are views showing the switching relationship of each mode.
Figure 2B:
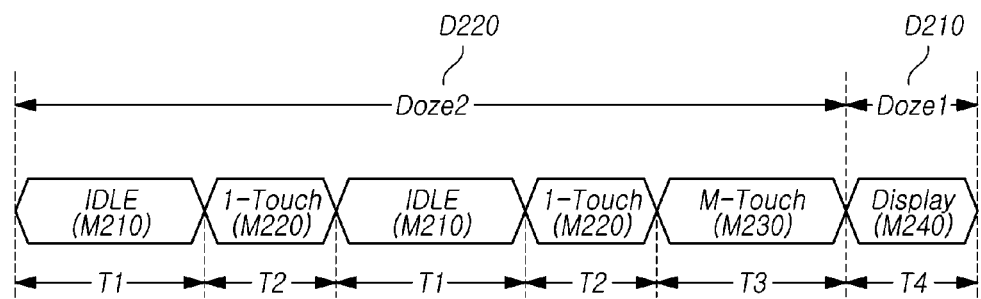
Figure 2C:
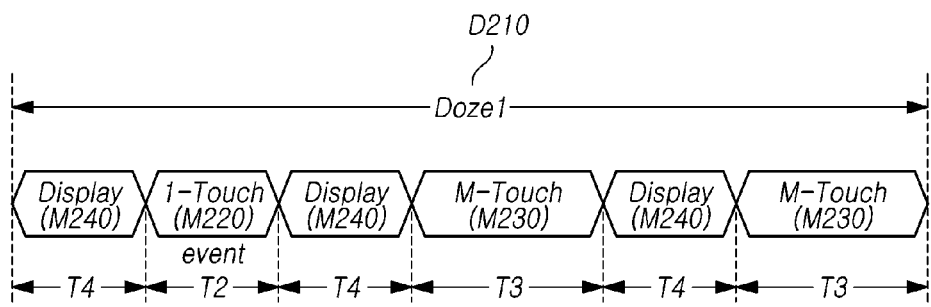

FIGS. 2A to 2C are views showing the switching relationship of each mode.

Referring to FIG. 2A, the display device 100 may be operated in an idle mode M210 during a first time period T1 and then may be switched to a one-touch mode M220. Next, the display device 100 may be operated in the one-touch mode M220 during a second time period T2 and then may be switched to the idle mode M210 again.

The display device 100 may be switched to the idle mode M210 when no touch is recognized during the second time period T2 in the one-touch mode M220, and may be switched to the multi-touch mode M230 when a touch is recognized in the one-touch mode M220.

The display device 100 may be switched to the one-touch mode M220 again when no touch is recognized during a third time period T3 in the multi-touch mode M230. When a display is turned off in the multi-touch mode M230, the display device 100 may be switched to the idle mode M210.

FIG. 2B is a view showing a mode switching relationship in a Doze-2 mode and a switching relationship from a Doze-2 mode to a Doze-1 mode.

Referring to FIG. 2B, the display device 100 may circulate among the idle mode M210, the one-touch mode M220, and the multi-touch mode M230 of a Doze-2 mode D220.

The display device 100 operating in the idle mode M210 of the Doze-2 mode D220 may be switched to the one-touch mode M220 when the first time period T1 has elapsed.

The display device 100 operating in the one-touch mode M220 of the Doze-2 mode D220 may be switched to the idle mode M210 again when no touch is detected during the second time period T2. On the other hand, the display device 100 operating in the one-touch mode M220 of the Doze-2 mode D220 may be switched to the multi-touch mode M230 when a touch is detected during the second time period T2.

The display device 100 operating in the multi-touch mode M230 of the Doze-2 mode D220 may be switched to a display mode M240 when a touch is detected during the third time period T3. At this time, the display mode M240 is a mode in which the data driving circuit 120 supplies a data signal to the data line DL and the gate driving circuit 130 supplies a scanning signal to the gate line GL, and in which an image is displayed on the panel 110. As a result, when the multi-touch mode M230 of the Doze-2 mode D220 is switched to the display mode M240, the Doze-2 mode D220 is also switched to the Doze-1 mode D210.

FIG. 2C is a view showing a mode switching relationship in a Doze-1 mode.

Referring to FIG. 2C, the display device 100 may circulate among the display mode M240, the one-touch mode M220, and the multi-touch mode M230 of the Doze-1 mode D210.

The display device 100 operating in the display mode M240 of the Doze-1 mode D210 may be switched to the one-touch mode M220 or the multi-touch mode M230 when a fourth time period T4 has elapsed. Whether the display device 100 is switched to the one-touch mode M220 or the multi-touch mode M230 may be determined according to a touch input state in the immediately preceding mode.

For example, when the immediately preceding mode of the display mode M240 is the one-touch mode M220 and a touch is detected in the one-touch mode M220, the display device 100 may be switched to the multi-touch mode M230 after the display mode M240.

On the other hand, when the immediately preceding mode of the display mode M240 is the one-touch mode M220 and no touch is detected in the one-touch mode M220, the display device 100 may be switched to the one-touch mode M220 again after the display mode M240.

By way of another example, when the immediately preceding mode of the display mode M240 is the multi-touch mode M230 and a touch is detected in the multi-touch mode M230, the display device 100 may be switched to the multi-touch mode M230 again after the display mode M240.

On the other hand, when the multi-touch mode M230 and the display mode M240 are switched to each other in order of N (natural number of 1 or more) and no touch is detected in this process, the display device 100 may be switched to the one-touch mode M220 after the display mode M240.

The display device 100 may eliminate unnecessary touch driving and may reduce power consumption while is driven in the idle mode M210 and the one-touch mode M220, which are low power modes, under predetermined conditions as in the above-described embodiment.

Hereinafter, an embodiment in which detailed components of the touch driving circuit 140 are operated in the one-touch mode M220 and the multi-touch mode M230 will be described in more detail.

Figure 3A:
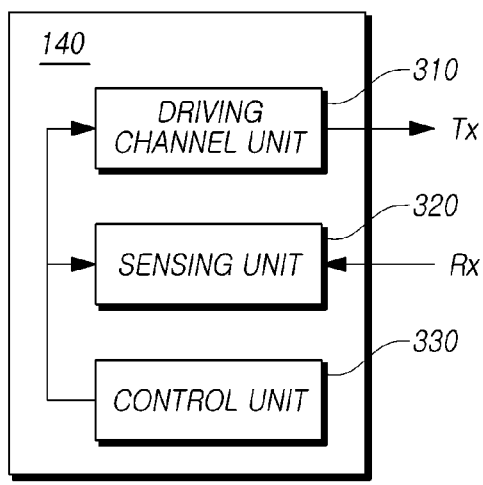
FIGS. 3A and 3B are views showing examples of internal components of a touch driving circuit.
Figure 3B:
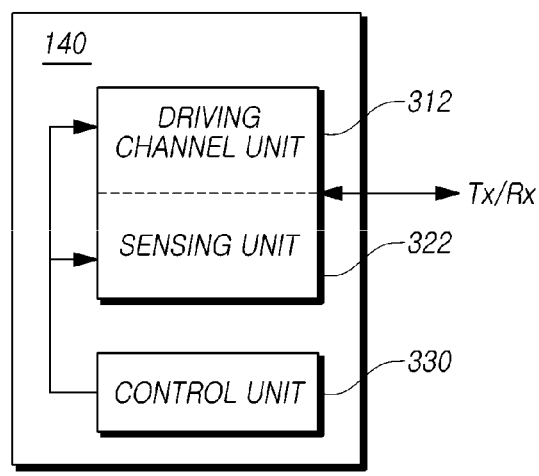

FIGS. 3A and 3B are views showing examples of internal components of a touch driving circuit.

Referring to FIG. 3A, the touch driving circuit 140 may include a driving channel unit 310, a sensing unit 320, and a control unit 330.

The driving channel unit 310 may supply a driving voltage to sensor electrodes SE or a sensor electrode group constituted of the sensor electrodes SE.

The sensing unit 320 may detect a proximity or a touch of an external object to the panel 110 using a response signal of the sensor electrodes SE or the sensor electrode group to the driving voltage.

At this time, an output line to which the driving voltage is supplied and a reception line at which the response signal is received may be separated. From the viewpoint that signal lines are separated, the driving channel unit 310 and the sensing unit 320 may have independent circuit configurations, and information can be exchanged between the driving channel unit 310 and the sensing unit 320 through signals or communication.

The control unit 330 may control the driving mode and timing of the driving channel unit 310 and the sensing unit 320 by supplying a control signal to the driving channel unit 310 and the sensing unit 320, and may process information or signals received from the sensing unit 320 to generate touch coordinates or the like.

FIG. 3B is an example of the internal components of the touch driving circuit according to another embodiment different from that of FIG. 3A.

Referring to FIG. 3B, the touch driving circuit 140 may include a driving channel unit 312, a sensing unit 322, and a control unit 330.

The driving channel unit 312 may supply a driving voltage to sensor electrodes SE or a sensor electrode group constituted of the sensor electrodes SE.

The sensing unit 322 may detect a proximity or a touch of an external object to the panel 110 using a response signal of the sensor electrodes SE or the sensor electrode group to the driving voltage.

At this time, an output line to which the driving voltage is supplied and a reception line at which the response signal is received may be the same line. From the viewpoint that the driving voltage is supplied through the same signal line and the response signal is received, the driving channel unit 312 and the sensing unit 322 may be configured to share some circuit components. At this time, the shared some circuit components may be active or passive elements such as resistors or capacitors, or may be simple signal lines.

The control unit 330 may control the driving mode and timing of the driving channel unit 312 and the sensing unit 322 by supplying a control signal to the driving channel unit 312 and the sensing unit 322, and may process information or signals received from the sensing unit 322 to generate touch coordinates or the like.

Hereinafter, for convenience of description, the touch driver circuit 140 includes the driving channel unit 312 and the sensing unit 322, which share some circuit components, as in the embodiment shown in FIG. 3B.

Figure 4:
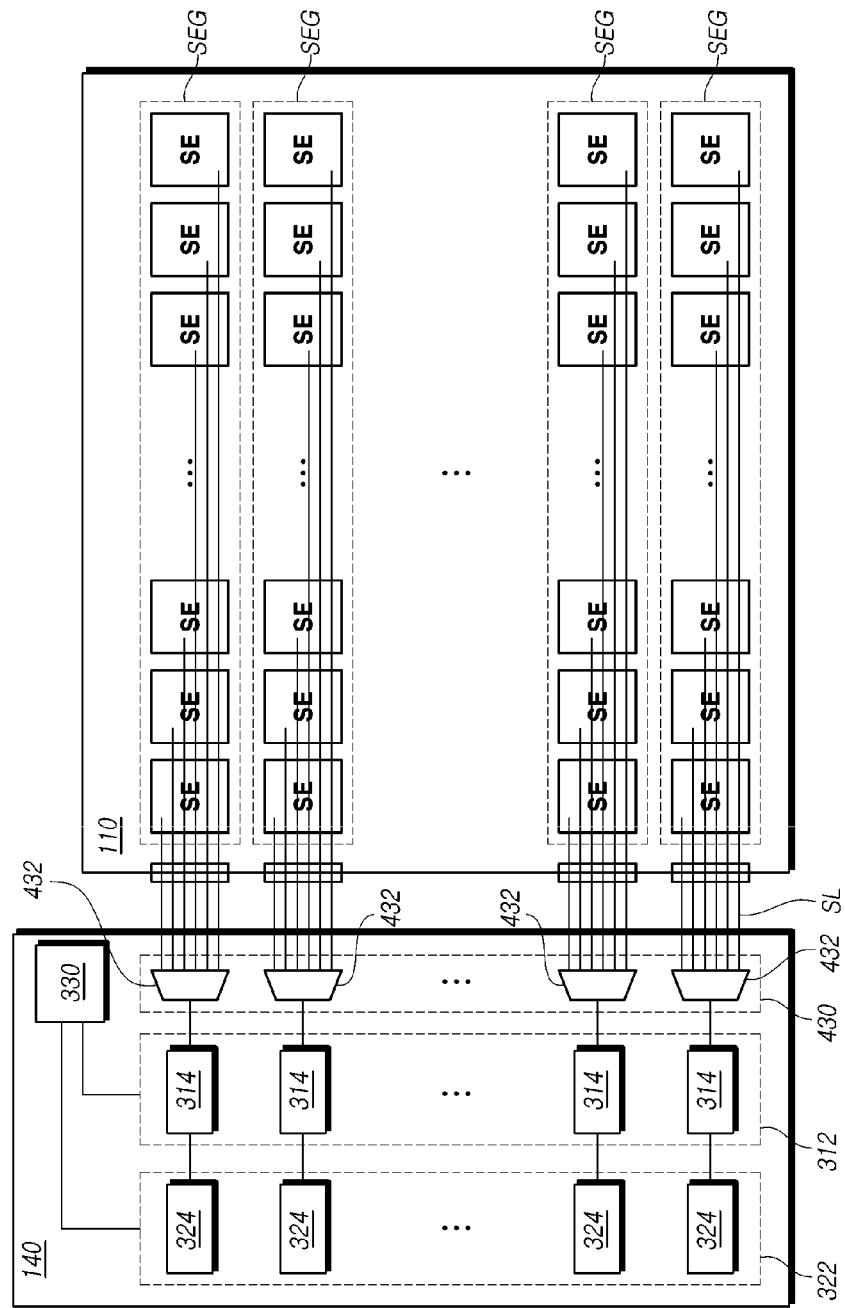
FIG. 4 is a view showing a connection relationship between a sensor electrode and a touch driving circuit.

FIG. 4 is a view showing a connection relationship between a sensor electrode and a touch driving circuit.

Referring to FIG. 4, the touch driving circuit 140 may include the driving channel unit 312, the sensing unit 322, and the control unit 330, and may further include a connection unit 430.

The connection unit 430 may be connected to a plurality of sensor electrodes SE through a plurality of sensing lines SL.

The connection unit 430 may be connected to the plurality of sensing lines SL through a multiplexer (MUX) 432 while including the MUX 432.

The MUX 432 may select one of two or more sensing lines SL connected to each other and may connect the selected sensing line SL to the driving channel unit 312. The MUX 432 may select a plurality of sensing lines SL among the two or more sensing lines SL connected to each other and may connect the selected plurality of sensing lines SL to the driving channel unit 312. As an example, the MUX 432 may select all of the two or more sensing lines SL connected to each other and may connect them to the driving channel unit 312.

The plurality of sensor electrodes SE may form one sensor electrode group SEG.

Referring to FIG. 4, a plurality of sensor electrodes SE connected to one MUX 432 may form one sensor electrode group SEG.

When the sensor electrodes are arranged in a matrix shape in the transverse and longitudinal directions, for example, a plurality of sensor electrodes SE forming one line in the transverse direction may form one sensor electrode group SEG. By way of another example, a plurality of sensor electrodes SE forming one line in the longitudinal direction may form one sensor electrode group SEG. By way of another example, a plurality of sensor electrodes SE forming two or more lines in the transverse direction may form one sensor electrode group SEG, and a plurality of sensor electrodes SE forming two or more lines in the longitudinal direction may form one sensor electrode group SEG.

The sensor electrode group SEG may be connected to the driving channel unit 312 through the MUX 432.

At this time, the driving channel unit 312 may include a plurality of driving channels 314, and each sensor electrode group SEG may be connected to each of the driving channels 314.

In accordance with this connection relationship, each of the driving channels 314 may drive each of the sensor electrodes SE individually, and may drive the entire sensor electrode group SEG.

For example, when the MUX 432 sequentially selects the plurality of sensor electrodes SE constituting the sensor electrode group SEG one by one, the driving channel 314 may sequentially drive the respective sensor electrodes SE. In addition, when the MUX 432 selects the entire or a part of the sensor electrode group SEG, the driving channel 314 may drive the selected plurality of sensor electrodes SE together.

The sensing unit 322 may detect a proximity or a touch of an object to the panel 110 according to a response signal of the sensor electrode SE or the sensor electrode group SEG which is transmitted through the sensing line SL. The sensing unit 322 may include a plurality of sensing channels 324, and each of the sensing channels 324 may be connected to the sensor electrode group SEG.

When the MUX 432 selects one sensor electrode SE, the driving channel 314 supplies a driving voltage to the selected one sensor electrode SE. The sensing channel 324 may receive the response signal transmitted through the MUX 432 and may detect a touch while the state of the MUX 432 is not changed.

When the MUX 432 selects one sensor electrode group SEG, the driving channel 314 supplies a driving voltage to the selected one sensor electrode group SEG. The sensing channel 324 may receive the response signal transmitted through the MUX 432 and may detect a touch while the state of the MUX 432 is not changed.

The control unit 330 may control the operation mode of each of the driving channel unit 312, the sensing unit 322, and the connection unit 430.

The driving channel unit 312, the sensing unit 322, and the connection unit 430 may be operated in the one-touch mode M220 and the multi-touch mode M230.

In the multi-touch mode M230, the connection unit 430 connects each of the plurality of sensor electrodes SE to the driving channel unit 312. The driving channel unit 312 may drive each of the plurality of sensor electrodes SE, and the sensing unit 322 may detect a proximity or a touch of an external object to the panel 110 using a response signal received from each of the plurality of sensor electrodes SE.

In the one-touch mode M220, the connection unit 430 may connect the sensor electrode group SEG including the plurality of sensor electrodes SE to the driving channel unit 312. The driving channel unit 312 may drive the sensor electrode group SEG, and the sensing unit 322 may detect a proximity or a touch of an external object to the panel 110 using a response signal received from the sensor electrode group SEG.

Figure 5:
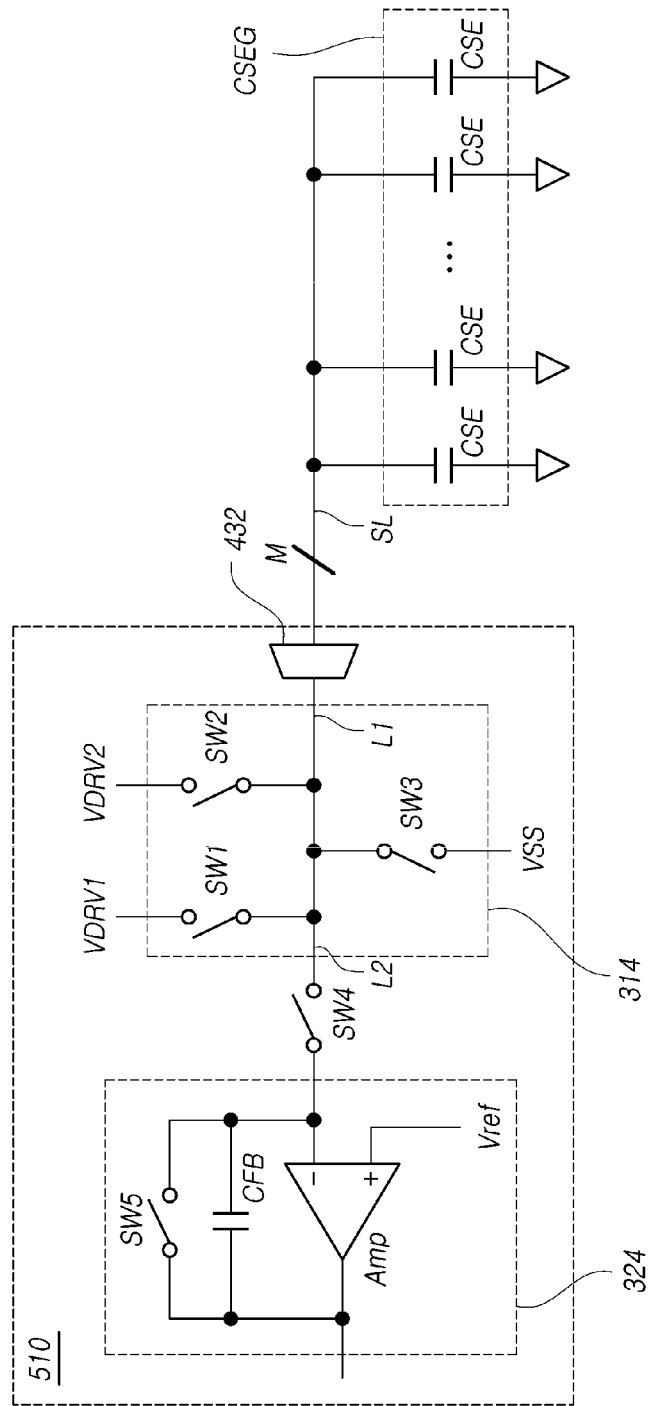
FIG. 5 shows a circuit model of a sensing channel.

FIG. 5 shows a circuit model of a sensing channel.

The driving channel 314 and the sensing channel 324 connected to the driving channel 314 may constitute one sensing channel 510. Here, the sensing channel 324 may be a circuit component included in the sensing unit 322 as a circuit at which one response signal is received from the sensor electrode SE or the sensor electrode group SEG.

Referring to FIG. 5, a first capacitance CSE may be formed in each of the sensor electrodes SE, and the sensing unit 322 may measure the magnitude or variation of the first capacitance CSE to detect a proximity or a touch of an external object to the panel 110. Alternatively, the sensing unit 322 may measure a value (e.g., an amount of charge or a charge variation) interlocked with the magnitude or variation of the first capacitance CSE to detect the proximity or the touch of the external object to the panel 110.

A plurality of sensor electrodes SE may be connected to each other to form a sensor electrode group SEG. A second capacitance CSEG may be formed in the sensor electrode group SEG. The sensing unit 322 may measure the magnitude or variation of the second capacitance CSEG to detect a proximity or a touch of an external object to the panel 110. Alternatively, the sensing unit 322 may measure a value (e.g., an amount of charge or a charge variation) interlocked with the magnitude or variance of the second capacitance CSEG to detect proximity or a touch of the external object to the panel 110.

The MUX 432 may select some or all of the connected M (M is a natural number) sensing lines SL to connect each of the sensor electrodes SE to the driving channel 314 or connect the sensor electrode group SEG to the driving channel 314. At this time, when the MUX 432 connects one sensing line SL to the driving channel 314, the first capacitance CSE is connected to the driving channel 314 as a load. In addition, when the MUX 432 selects a plurality of sensing lines SL and connects the sensor electrode group SEG to the driving channel 314, the second capacitance CSEG is connected to the driving channel 314 as a load.

The second capacitance CSEG may be larger in magnitude than the first capacitance CSE because the plurality of first capacitances CSE is connected in parallel.

At this time, when the driving channel 314 drives the first capacitance CSE and the second capacitance CSEG with a driving voltage of the same magnitude, a charge greater than that in the first capacitance CSE may be accumulated in the second capacitance CSEG, and the greater charge may be burdened on the sensing channel 324.

Accordingly, the driving channel 314 supplies a first driving voltage VDRV1 to the sensor electrode SE in a mode in which one sensor electrode SE is connected (for example, the multi-touch mode M230), and may supply a second driving voltage VDRV2 to the sensor electrode group SEG in a mode in which one sensor electrode group SEG is connected (for example, the one-touch mode M220).

Here, the second driving voltage VDRV2 may be smaller than the first driving voltage VDRV1.

$$Q = C \times V \qquad \text{[Equation 1]}$$

An amount of charge accumulated in the capacitance is proportional to the magnitude and voltage of the capacitance. Since the magnitude of the second capacitance CSEG is greater than the magnitude of the first capacitance CSE, the driving channel 314 may make the magnitude of the second driving voltage VDRV2 smaller than that of the first driving voltage VDRV1, thereby partially reducing the amount of charge accumulated in the second capacitance CSEG.

The driving channel 314 may be connected to a first driving voltage source for supplying the first driving voltage VDRV1 and a second driving voltage source for supplying the second driving voltage VDRV2. At this time, the driving channel 314 may include a first switch SW1 connected to the first driving voltage source and an output line L1 of the driving channel 314 and a second switch SW2 connected to the second driving voltage source and the output line L1 of the driving channel 314. The driving channel 314 may close the first switch SW1 and open the second switch SW2 in the multi-touch mode M230, and may open the first switch SW1 and close the second switch SW2 in the one-touch mode M220.

Meanwhile, the driving channel 314 may include a third switch SW3 for resetting the charge accumulated in the sensor electrode SE or the sensor electrode group SEG, and the third switch SW3 may be connected to the output line L1 of the driving channel 314 and a low voltage line (VSS, for example, a ground voltage line) thereof.

The sensing unit 322 may detect a proximity or a touch of an external object to the panel 110 using a response signal of the sensor electrode SE to the first driving voltage VDRV1 or a response signal of the sensor electrode group SEG to the second driving voltage VDRV2.

The sensing unit 322 may include an integrator that measures an amount of charge accumulated in the sensor electrode SE or the sensor electrode group SEG or a charge variation in order to measure a change in the capacitance of the sensor electrode SE or the sensor electrode group SEG.

Referring to FIG. 5, in the integrator, a first input unit ((−) input terminal of Amp) may be connected to a reception line L2 that receives a response signal, an integral cap CFB may be located between the first input unit ((−) input terminal of Amp) and an output unit (output terminal of Amp), and a reference voltage (Vref) may be input to a second input unit ((+) input terminal of Amp). The sensing unit 322 may detect the proximity or the touch of the external object to the panel 110 using the signal of the output unit (output terminal of Amp) of the integrator.

The reception line L2 at which the response signal is received may be connected to the output line L1 of the driving channel 314. Thus, in order to prevent the driving voltage from being supplied to the reception line L2 directly, a fourth switch SW4 may be located between the integrator and the driving channel 314. In the integrator, a fifth switch SW5 for resetting the integral cap CFB may be connected in parallel with the integral cap CFB.

The charge stored in the integral cap CFB may be a part of the charge stored in the first capacitance CSE or a part of the charge stored in the second capacitance CSEG. More specifically, the charge stored in the integral cap CFB may be proportional to a value obtained by subtracting a reference voltage Vref from a voltage across the first capacitance CSE or a value obtained by subtracting the reference voltage Vref from a voltage across the second capacitance CSEG.

The sensing unit 322 may apply the reference voltage Vref differently in the one-touch mode M220 and the multi-touch mode M230. For example, the sensing unit 322 may supply a first reference voltage VREF1 to a second input unit ((+) input terminal of Amp) of the integrator in the multi-touch mode M230, and may supply a second reference voltage VREF2 to the second input unit ((+) input terminal of Amp) in the one-touch mode M220. At this time, the magnitude of the second reference voltage VREF2 may be larger than the first reference voltage VREF1.

$$QSE = CSE \times (VDRV - VREF1), QSEG = CSEG \times (VDRV - VREF2) \quad \text{[Equation 2]}$$

In Equation 2, QSE denotes is an amount of charge accumulated in the integral cap CFB in the multi-touch mode M230, and QSEG denotes an amount of charge accumulated in the integral cap CFB in the one-touch mode M220. VDRV denotes a driving voltage transmitted to the sensor electrode SE or the sensor electrode group SEG.

Since the magnitude of the second capacitance CSEG acting as a load in the one-touch mode M220 is larger than the first capacitance CSE acting as a load in the multi-touch mode M230, the sensing unit 322 may reduce the amount of charge accumulated in the integral cap CFB using the second reference voltage VREF2 that is larger than the first reference voltage VREF1.

The one-touch mode M220 is a mode for reducing power consumption required for driving by simultaneously driving the sensor electrodes SE disposed in a large area when there is not much touch input. At this time, since there is not much touch input, a period in which the driving voltage is supplied in the one-touch mode M220 may be longer than a period in which the driving voltage is supplied in the multi-touch mode M230. The display device 100 may reduce power consumption by differently setting the supply period of the driving voltage for each mode.

In the multi-touch mode M230, all the sensor electrodes SE may be driven to accurately extract touch coordinates. In contrast, in the one-touch mode M220, only the presence or absence of a touch on the panel 110 may be detected, so that the sensing area of the one-touch mode M220 may correspond to only some of the sensor electrodes SE other than all of the sensor electrodes SE. Accordingly, an area of the sensor electrode SE to which the second driving voltage VDRV2 is supplied may be smaller than an area of the sensor electrode SE to which the first driving voltage VDRV1 is supplied according to the one-touch mode M220.

Meanwhile, the sensing unit 322 may detect the proximity or the touch of the external object to the panel 110 using a difference in the response signals between the sensor electrode groups SEG.

Figure 6:
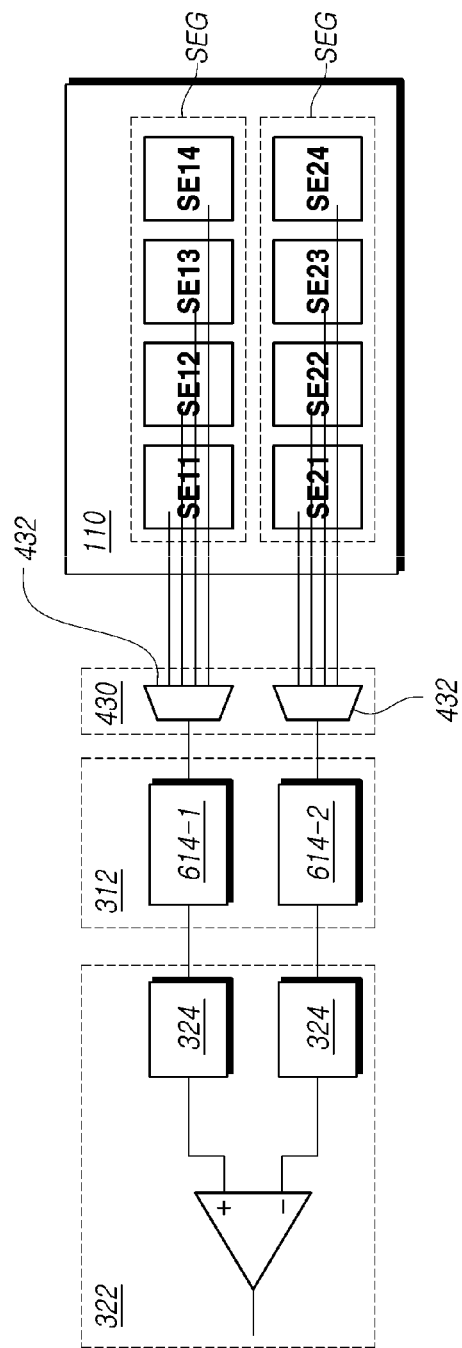
FIG. 6 is a view illustrating a first example in which a sensing unit uses a difference in response signals between sensor electrode groups.

FIG. 6 is a view illustrating a first example in which a sensing unit uses a difference in response signals between sensor electrode groups.

Referring to FIG. 6, in the panel 110, a plurality of sensor electrodes SE11 to SE14 and SE21 to SE24 are located. The sensor electrodes SE11 to SE14 and SE21 to SE24 forming one sensor electrode line in one direction may form sensor electrode groups SEG-1 and SEG-2. For example, the plurality of sensor electrodes SE11 to SE14 located on the first sensor electrode line may form the first sensor electrode group SEG-1, and the plurality of sensor electrodes SE21 to SE24 may form the second sensor electrode group SEG-2.

A first driving channel 614-1 included in the driving channel unit 312 may supply a driving voltage to the first sensor electrode SE11 in a first mode (e.g., multi-touch mode), and may supply a driving voltage to the first sensor electrode group SEG-1 including the first sensor electrode SE11 in a second mode (e.g., one-touch mode).

In addition, a second driving channel 614-2 included in the driving channel unit 312 may supply a driving voltage to the second sensor electrode SE21 in a first mode (e.g., multi-touch mode), and may supply a driving voltage to the second sensor electrode group SEG-2 including the second sensor electrode SE21 in a second mode (e.g., one-touch mode).

At this time, the magnitude of the driving voltage supplied to the first sensor electrode SE11 and the second sensor electrode SE21 and the magnitude of the driving voltage supplied to the first sensor electrode group SEG-1 and the second sensor electrode group SEG-2 may be the same or different. For example, a driving voltage for driving the sensor electrodes SE individually may be larger than a driving voltage for driving the sensor electrode group SEG.

The sensing unit 322 may detect a proximity or a touch of an external object to the panel 110 using a difference in a response signal of the first sensor electrode group SEG-1 to the driving voltage and a response signal of the second sensor electrode group SEG-2 to the driving voltage in the second mode. This method is a kind of differential sensing method. The differential sensing method has the effect of reducing a measured value (e.g., a measured value of the capacitance or a measured value of an amount of charge), as well as removing noise.

For example, a first sensing channel 324-1 connected to the first sensor electrode group SEG-1 may process the response signal of the first sensor electrode group SEG-1 to measure a first value corresponding to the capacitance or variation of the first sensor electrode group SEG-1. A second sensing channel 324-2 connected to the second sensor electrode group SEG-2 may process the response signal of the second sensor electrode group SEG-2 to measure a second value corresponding to the capacitance or variation of the second sensor electrode group SEG-2. The sensing unit 322 may detect the proximity or the touch of the external object to the panel 110 using a difference in the first value and the second value.

Figure 7:
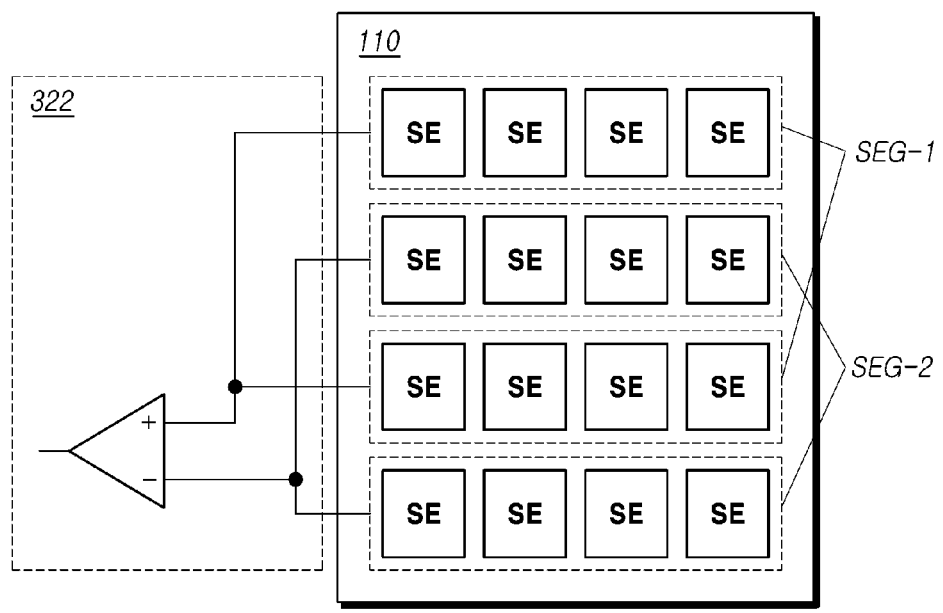
FIG. 7 is a view illustrating a second example in which a sensing unit uses a difference in response signals between sensor electrode groups.

FIG. 7 is a view illustrating a second example in which a sensing unit uses a difference in response signals between sensor electrode groups.

Referring to FIG. 7, a plurality of sensor electrodes SE may be disposed on the panel 110, and the plurality of sensor electrode SE may form a plurality of sensor electrode lines.

At this time, the first sensor electrode group SEG-1 may be composed of at least one odd-numbered sensor electrode line, and the second sensor electrode group SEG-2 may be composed of at least one even-numbered sensor electrode line.

The sensing unit 322 may detect a proximity or a touch of an external object to the panel 110 using a difference in a response signal of the first sensor electrode group SEG-1 composed of the odd-numbered sensor electrode line and a response signal of the first second sensor electrode group SEG-2 composed of the even-numbered sensor electrode line.

Figure 8:
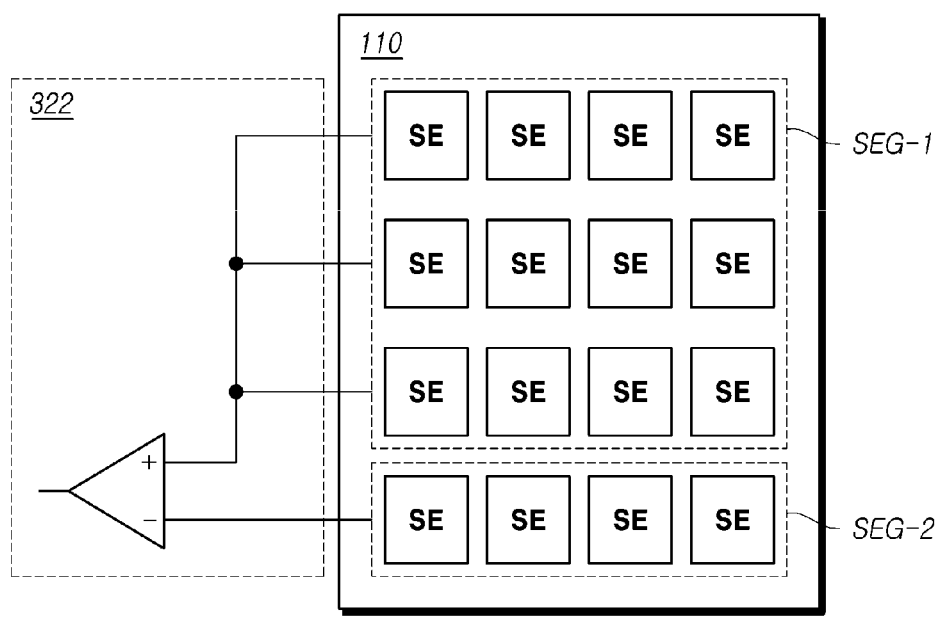
FIG. 8 is a view illustrating a third example in which a sensing unit uses a difference in response signals between sensor electrode groups.

FIG. 8 is a view illustrating a third example in which a sensing unit uses a difference in response signals between sensor electrode groups.

Referring to FIG. 8, a plurality of sensor electrodes SE may be disposed on the panel 110, and the plurality of sensor electrode SE may form a plurality of sensor electrode lines.

At this time, the first sensor electrode group SEG-1 may be composed of two or more sensor electrode lines and the second sensor electrode group SEG-2 may be composed of one sensor electrode line-reference sensor electrode line, for example, a sensor electrode line located at an edge.

The sensing unit 322 may detect a proximity or a touch of an external object to the panel 110 using a difference in a response signal of the first sensor electrode group SEG-1 composed of the two or more sensor electrode lines and a response signal of the second sensor electrode group SEG-2 composed of one sensor electrode line (reference sensor electrode line).

Meanwhile, the sensing unit 322 may measure a difference in self-capacitance between the first sensor electrode group SEG-1 and the second sensor electrode group SEG-2 to detect the proximity or the touch of the external object to the panel 110. At this time, each of the sensor electrodes SE constituting the first sensor electrode group SEG-1 and the second sensor electrode group SEG-2 may be perpendicular to (intersect with) the gate line GL disposed on the panel 110. In other words, a direction in which a corresponding screen is scanned and a direction in which the sensor electrodes SE are arranged in the sensor electrode group SEG may be perpendicular to each other.

Meanwhile, the touch driving circuit 140 may detect a touch in a mutual capacitance method with respect to the sensor electrode group SEG.

Figure 9:
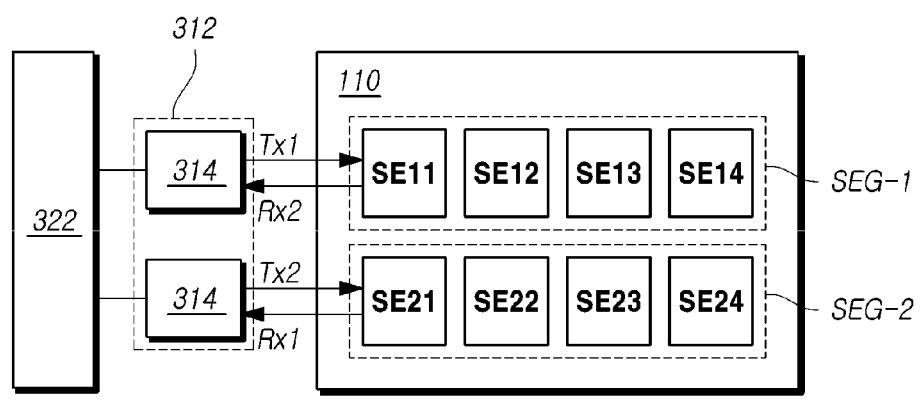
FIG. 9 is a view showing a case in which a touch is detected in a mutual capacitance manner with respect to a sensor electrode group.

FIG. 9 is a view showing a case in which a touch is detected in a mutual capacitance manner with respect to a sensor electrode group.

Referring to FIG. 9, the plurality of sensor electrodes SE11 to SE14 and SE21 to SE24 are disposed on the panel 110.

The driving channel unit 312 may supply a driving voltage to the first sensor electrode SE11 and the second sensor electrode SE21 in a first mode (e.g., multi-touch mode), may supply a first frame driving voltage TX1 to the first sensor electrode group SEG-1 including the first sensor electrode SE11 in a first frame of a second mode (e.g., one-touch mode), may receive a first response signal RX1 to the second sensor electrode group SEG-2 including the second sensor electrode SE21, may supply a second frame driving voltage TX2 to the second sensor electrode group SEG-2 in a second frame of the second mode, and may receive a second response signal RX2 to the first sensor electrode group SEG-1.

This driving method is also referred to as a mutual capacitance method in which an electrode for inputting a driving voltage and an electrode for receiving a response signal are separated from each other.

In the embodiment shown in FIG. 9, since the first sensor electrode group SEG-1 and the second sensor electrode group SEG-2 are adjacent to each other although they are separated from each other, mutual capacitance may be formed between the two sensor electrode groups SEG-1 and SEG-2. The first frame driving voltage TX1 supplied to the first frame is supplied to the first sensor electrode group SEG-1 and is transmitted to the second sensor electrode group SEG-2 through the mutual capacitance between the two sensor electrode groups SEG-1 and SEG-2, thereby outputting the first response signal RX1. Similarly, the second frame driving voltage TX2 supplied to the second frame is supplied to the second sensor electrode group SEG-2 and is transmitted to the first sensor electrode group SEG-1 through the mutual capacitance between the two sensor electrode groups SEG-1 and SEG-2, thereby outputting the second response signal RX2.

The sensing unit 322 may detect a proximity or a touch of an external object to the panel 110 using a difference between the first response signal RX1 and the second response signal RX2. This method may be referred to as two-frame differential sensing, but the present disclosure is not limited to this name.

In this embodiment, the plurality of sensor electrodes SE11 to SE14 and SE21 to SE24 may form a plurality of sensor electrode lines. The first sensor electrode group SEG-1 may be composed of at least one odd-numbered sensor electrode line, and the second sensor electrode group SEG-2 may be composed of at least one even-numbered sensor electrode line.

As described above, according to the present disclosure, it is possible to reduce an amount of power required for touch driving by eliminating unnecessary touch driving.

As a specific embodiment, the display device 100 may reduce the power consumption by grouping and driving the plurality of sensor electrodes SE in the one-touch mode. At this time, when the plurality of sensor electrodes SE are grouped into the sensor electrode group SEG, a problem arises in that the load (capacitance) of the touch driving circuit increases. In the embodiment of the present disclosure, this problem can be solved by setting differently the magnitude of the driving voltage depending on the mode or sensing the same in a differential manner.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The invention claimed is:

1. A touch driving device for driving a touch panel, comprising:
    a driving channel configured to supply a first driving voltage to one sensor electrode in a first mode and to supply a second driving voltage that is less than the first driving voltage to one sensor electrode group including at least two or more sensor electrodes in a second mode;
    a sensing unit configured to detect during the second mode a touch of the touch panel by an external object using a response signal of the one sensor electrode group in response to the second driving voltage in the second mode, and is configured to detect during the first mode a location of the touch of the touch panel using a response signal of the one sensor electrode in response to the first driving voltage in the first mode; and
    a connection unit configured to connect the one sensor electrode to the driving channel in the first mode, to connect the one sensor electrode group to the driving channel in the second mode, and to be switched from the second mode to the first mode when the sensing unit detects the touch of the external object to the touch panel in the second mode,
    wherein the sensing unit comprises an integrator and detects the touch of the external object to the touch panel using a first signal of an output unit of the integrator in the second mode, and detects the location of the touch using a second signal of the output unit of the integrator in the first mode.

2. The touch driving device of claim 1, wherein the driving channel
    comprises a first switch connected to a first driving voltage source and an output line of the driving channel, and a second switch connected to a second driving voltage source and the output line of the driving channel, and
    closes the first switch and opens the second switch in the first mode, and opens the first switch and closes the second switch in the second mode.

3. The touch driving device of claim 1, wherein the sensing unit detects the touch of the external object by measuring an amount of charge of the one sensor electrode group during the second mode according to the response signal of the one sensor group during the second mode, and detects the location of the touch during the first mode by measuring an amount of charge of the one sensor electrode according to the response signal of the one sensor electrode during the first mode.

4. The touch driving device of claim 1, wherein in the integrator, a first input unit is connected to a reception line of the response signal, an integral cap is located between the first input unit and an output unit, and a reference voltage is input to a second input unit.

5. The touch driving device of claim 4, wherein
    a first reference voltage is supplied to the second input unit in the first mode and a second reference voltage is supplied to the second input unit in the second mode, and
    the second reference voltage is greater than the first reference voltage.

6. The touch driving device of claim 1, wherein a supply period of the second driving voltage is longer than a supply period of the first driving voltage.

7. A touch driving device for driving a touch panel including a plurality of sensor electrodes, comprising:
    a first driving channel configured to supply a driving voltage to a first sensor electrode in a first mode and to supply the driving voltage to a first sensor electrode group including the first sensor electrode in a second mode;
    a second driving channel configured to supply the driving voltage to a second sensor electrode in the first mode and to supply the driving voltage to a second sensor electrode group including the second sensor electrode in the second mode; and
    a sensing unit configured to detect during the second mode a touch of the touch panel by an external object using a difference between a response signal of the first sensor electrode group to the driving voltage and a response signal of the second sensor electrode group to the driving voltage in the second mode, and to be switched to the first mode responsive to detecting the touch during the second mode, and is configured to detect during the first mode a location of the touch using at least one of a response signal of the first sensor electrode to the driving voltage supplied to the first sensor electrode or a response signal of the second sensor electrode to the driving voltage supplied to the second sensor electrode during the first mode,
    wherein the sensing unit comprises an integrator and detects the touch of the external object to the touch panel using a first signal of an output unit of the integrator in the second mode, and detects the location of the touch using a second signal of the output unit of the integrator in the first mode.

8. The touch driving device of claim 7, wherein
    the plurality of sensor electrodes form a plurality of sensor electrode lines, and
    the first sensor electrode group is composed of at least one odd-numbered sensor electrode line and the second sensor electrode group is composed of at least one even-numbered sensor electrode line.

9. The touch driving device of claim 7, wherein
    the plurality of sensor electrodes form a plurality of sensor electrode lines, and
    the first sensor electrode group is composed of two or more sensor electrode lines and the second sensor electrode group is composed of one sensor electrode line.

10. The touch driving device of claim 7, wherein the sensing unit detects the touch of the external object during the second mode by measuring a difference in self-capacitances of the first sensor electrode group and the second sensor electrode group.

11. The touch driving device of claim 10, wherein the sensor electrodes constituting the first sensor electrode group and the second sensor electrode group are disposed to cross a gate line disposed on the touch panel.

12. The touch driving device of claim 7, wherein the first driving channel supplies a first driving voltage to the first sensor electrode in the first mode, and supplies a second driving voltage that is less than the first driving voltage to the first sensor electrode group in the second mode.

13. A touch driving device for driving a touch panel including a plurality of sensor electrodes, comprising:
    a driving channel unit configured to supply a driving voltage to a first sensor electrode and a second sensor electrode in a first mode, to supply the driving voltage to a first sensor electrode group including the first sensor electrode in a first frame of a second mode, to receive a first response signal from a second sensor electrode group including the second sensor electrode, to supply the driving voltage to the second sensor electrode group in a second frame of the second mode, and to receive a second response signal to the first sensor electrode group; and a sensing unit configured to detect during the second mode a touch of the touch panel by an external object using a difference between the first response signal and the second response signal, and is to be switched from the second mode to the first mode responsive to detecting the touch during the second mode and is configured to detect during the first mode a location of the touch using at least one of a response signal of the first sensor electrode to the driving voltage supplied to the first sensor electrode or a response signal of the second sensor electrode to the driving voltage supplied to the second sensor electrode during the first mode, wherein the sensing unit comprises an integrator and detects the touch of the external object to the touch panel using a first signal of an output unit of the integrator in the second mode, and detects the location of the touch using a second signal of the output unit of the integrator in the first mode.

14. The touch driving device of claim 13, wherein the plurality of sensor electrodes form a plurality of sensor electrode lines, and the first sensor electrode group is composed of at least one odd-numbered sensor electrode line and the second sensor electrode group is composed of at least one even-numbered sensor electrode line.

15. The touch driving device of claim 13, wherein the first driving channel supplies a first driving voltage to the first sensor electrode in the first mode, and supplies a second driving voltage that is less than the first driving voltage to the first sensor electrode group in the second mode.

* * * * *